July 6, 1943. F. SHENTON ET AL 2,323,730
SHAFT SEAL
Filed Jan. 27, 1941  2 Sheets-Sheet 1

Inventors
FRANCIS SHENTON
LEON BUEHLER, JR.
By
Attorney

July 6, 1943.  F. SHENTON ET AL  2,323,730
SHAFT SEAL
Filed Jan. 27, 1941  2 Sheets-Sheet 2

Inventors
FRANCIS SHENTON
LEON BUEHLER, JR.

By T. Yates Dowell
Attorney

Patented July 6, 1943

2,323,730

UNITED STATES PATENT OFFICE 2,323,730

SHAFT SEAL

Francis Shenton and Leon Buehler, Jr., Waynesboro, Pa., assignors to Frick Company, Waynesboro, Pa., a corporation of Pennsylvania Application January 27, 1941, Serial No. 376,234

4 Claims. (Cl. 286—19)

This invention relates to means for effecting and maintaining a pressure-tight seal around a shaft where it passes through a wall or housing, as for example, the crankcase of a compressor for a refrigeration system. The present improved seal is particularly adapted for high speed turbo-compressors and other installations employing rapidly revolving heavy-duty shafts. In such installations, to maintain an effective seal over long periods of service without repair, it is necessary that coacting seal surfaces and adjacent parts be lubricated and cooled to minimize wear; and it is an object of the present invention to provide a seal of the type specified incorporating a simplified yet highly efficient cooling and lubricating system.

The foregoing and other objects and advantages will become apparent in view of the following description taken in conjunction with the drawings, wherein.

Figures 1, 2:
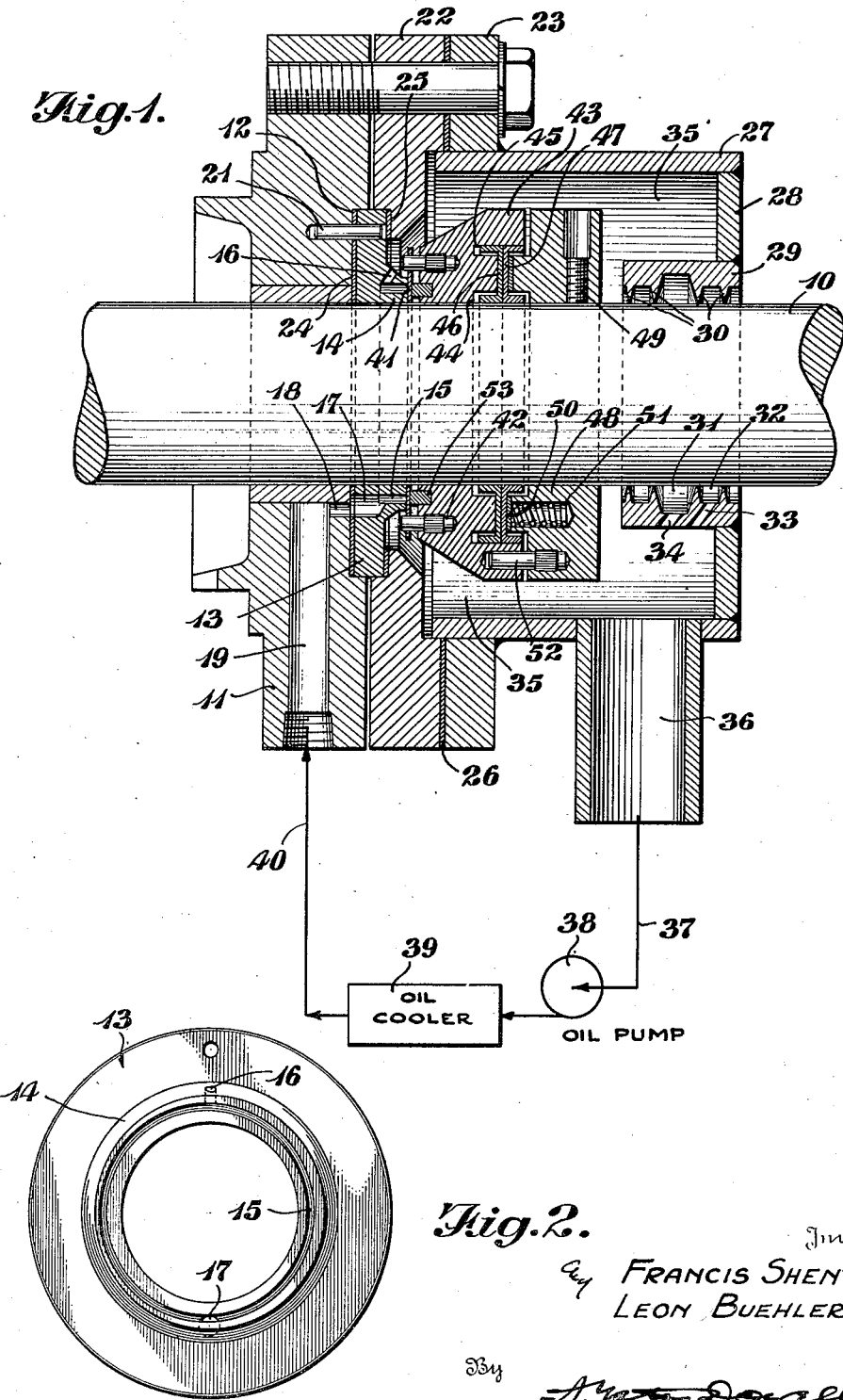
Fig. 1 is a substantially central longitudinal sectional view of a shaft seal assembly embodying the invention.
Fig. 2 is a view in face elevation of the seal nose forming part of the assembly of Fig. 1.

The seal of the present invention includes in part the unit disclosed in the co-pending application of Francis Shenton, Serial No. 272,275, filed May 6, 1939, now Patent No. 2,252,526. This unit effectively seals against leakage of fluid radially outwardly of the crankshaft as well as axially of the latter, and is particularly adapted for compressors wherein crankcase pressures fluctuate above and below atmospheric or outside pressure.

Referring to the drawings in detail, a shaft is shown at 10 extending through a housing 11 which may be the crankcase of a compressor (not shown) for a refrigeration system and by means of which shaft power is supplied for driving the compressor. The housing is recessed as at 12 to accommodate a seal member commonly termed a seal nose.

The seal nose is illustrated in face or front elevation in Fig. 2 and comprises an annular body 13 having a forwardly projecting nose 14 formed with a continuous annular relatively deep groove or oil feed channel 15 in the face thereof. This channel is formed eccentrically with respect to the axis of the seal nose or with respect to the axis of the shaft 10, to provide a wiping action with respect to the sealing surfaces with which it coacts. An overflow or by-pass port 16 is formed in the seal nose, and the latter is preferably so positioned that this port directs the cooling and lubricating fluid outwardly from the channel 15 into the chamber around the seal and cools and lubricates the parts of the seal in a manner to be more fully explained. Fluid is fed to the annular channel 15 through port 17 formed in the lower portion of the seal nose and which port in turn receives fluid from port 18 and enlarged port 19 formed in the housing 11.

The seal nose 13 may be secured in the recess 12 by means of pins 21 driven into the housing 11 and retained in position by means of clamp ring 22 and seal housing member 23. Gaskets 24 and 25 may be interposed between the body 13 of the seal nose and adjacent parts, and an additional gasket 26 may be provided between the ring 22 and member 23.

A seal housing 27 is provided and at one end is telescoped into a recess formed in clamp ring 22 and at its opposite end is closed by end plate 28. A seal member 29 is inserted in the end plate and is formed with a series of radially inwardly projecting fins 30 which provide a labyrinth seal around shaft 10 at this point to ensure against escape of oil outwardly along the shaft. Any oil which may leak into annular chambers 31 and 32 of the seal member 29 drains therefrom through ports 33 and 34 into main seal chamber 35. The oil from chamber 35 passes through port 36 and conduit 37 having oil pump 38 therein to oil cooler 39, from which it circulates through conduit 40, ports 19, 18 and 17, annular seal nose channel 15 and overflow port 16 back to said main seal chamber 35.

To effect a seal against leakage of fluid axially along the shaft 10, we prefer to utilize a unit substantially similar to that shown in the patent to Shenton heretofore noted, and comprising flexible seal and wear ring 41 which is connected by drive pins 42 to annular member or ring 43 mounted for axial movement on the shaft 10 while at the same time rotating with the shaft. The rear face of the ring 43 is formed with a pair of radially spaced annular recesses 44 and 45, and coacting with said ring 43 are a pair of flexible packing rings 46 and 47 which may be made of Neoprene or analogous material. These packing rings are of generally channel or C-shape in cross section and are arranged back-to-back with the axially projecting flanges thereof disposed in the recesses 44 and 45. A drive ring 48 is secured to the shaft 10 for rotation therewith by means of screw 49 and is provided with an annular axially projecting boss which engages between the flanges of the ring 47. A thrust plate or washer 50 is interposed between the annular boss of the drive ring 48 and flexible packing ring 47, and a series of thrust springs 51 are carried by the drive ring and abut against said plate or washer 49 to maintain a constant pressure on the metallic seal ring 41 and urge it into sealing relation with the coacting face of the seal nose. Drive pins 52 connect the drive ring 48 with the ring 43, said pins causing the rings to rotate in unison, yet permitting axial movement of ring 43.

A packing ring 53 is preferably inserted in the front face of the annular ring 43 and bears against the seal ring 41 to effect a seal against leakage of fluid at this point.

Fluid under pressure attempting to escape axially outwardly along the surface of the shaft 10 encounters the radially inner flange of packing ring 46 and urges said flange against the shaft, effecting a seal at this point. The fluid then passes between the ring 46 and axially movable annulus 43 and acts through the said annulus and packing ring 53 to urge the seal ring 41 against the coacting surface of the seal nose 14 in direct proportion to the pressure of the fluid. Should the pressure in the crankcase of the compressor drop below atmospheric, air is entrapped between the packing ring 47 and drive ring 48, and fluid pressure is then applied to the seal ring 41 through annulus 43 and packing ring 53 in the same manner. It will thus be seen that the seal is double-acting and coacts with the springs 51 to maintain a resilient sealing thrust on the seal ring 41 in direct proportion to the pressure of the fluid attempting to escape or leak past said seal ring.

The operation is substantially as follows:

The seal nose 14 is held stationary with the housing 11 while the seal ring 41 in contact with the sealing face of the nose rotates with the shaft. In large high speed installations, these contacting surfaces generate considerable heat which if not dissipated results in wear on the seal ring and/or seal nose. To effect a relatively rapid transfer of heat from these parts and to also lubricate the same, oil is caused to circulate from the oil cooler 39 through conduit 40, port or passageway 19, ports 18 and 17 into annular groove or channel 15; and since the latter feeds against the face of the seal ring 41, a constant circulation of a cooling lubricant is applied to this face. Sufficient pressure should be maintained in the system to effect circulation with sufficient rapidity to obtain the desired cooling action. Oil overflows or is discharged from channel 15 through port 16 into the chamber 35 surrounding the seal unit and comes in contact with the rapidly revolving seal ring and coacting parts and is thrown around and violently agitated in the said chamber, increasing the cooling action. Thus the oil acts as both a lubricant and a coolant. The labyrinth seal 30 prevents the escape of oil outwardly along the shaft 10.

Oil from the chamber 35 circulates by gravity through conduits 36 and 37 back to the oil cooler 39.

The oil cooler may be of any desired type, either water or air-cooled and need not necessarily be located exterior of the assembly as shown in the present instance, or the chamber 35 may be provided with a sufficiently large cooling surface or other means to effect the proper transfer of heat from the lubricant.

Figure 3:
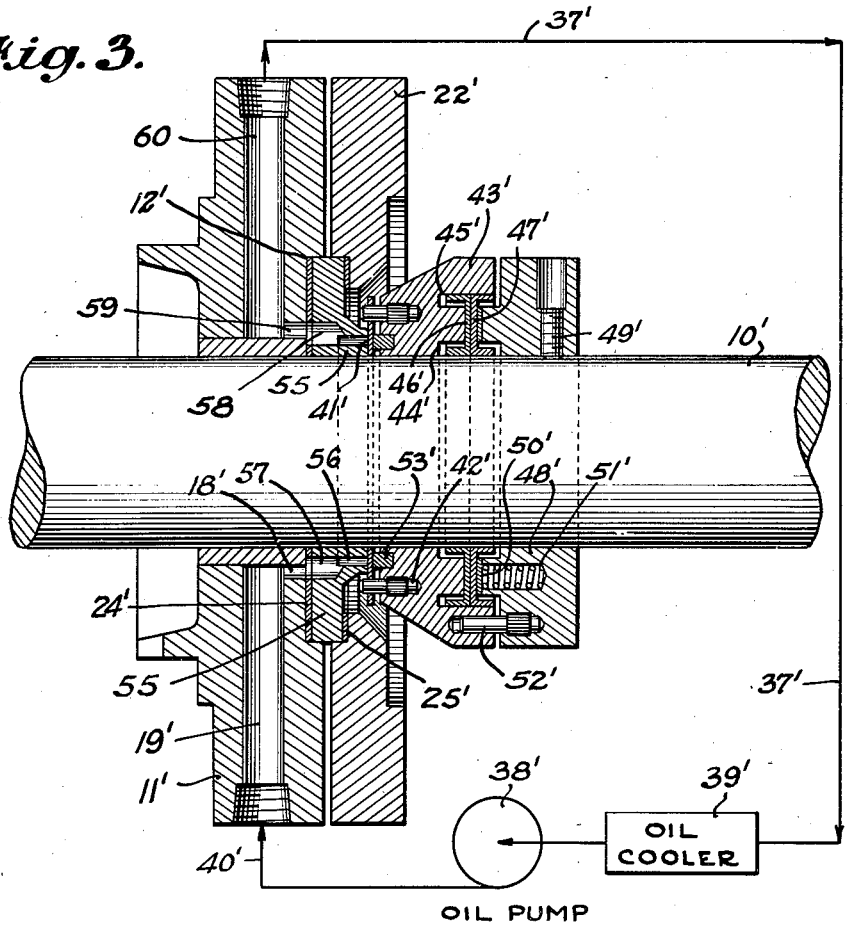
Fig. 3 is a view similar to Fig. 1 illustrating a modification in structure.
Figure 4:
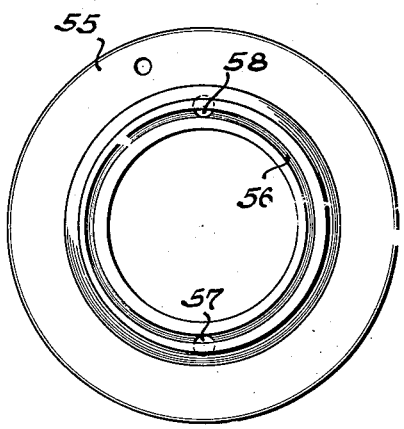
Fig. 4 is a view in face elevation of the seal nose forming part of the assembly of Fig. 3.

Fig. 3 illustrates a modified type of seal assembly with respect to that shown in Fig. 1, and parts which correspond to parts having the same function in Fig. 1 are given similar reference numerals with the exception that a prime has been added. In this instance, the seal housing has been eliminated and the oil or like lubricating and cooling fluid is circulated in a closed circuit through the seal nose in contact with the seal ring.

Referring to Fig. 3 in detail, the seal nose is here indicated at 55 and is provided with a continuous channel or groove 56 in the face thereof. Oil is fed to this channel or groove through inlet port 57 and is discharged therefrom through exhaust port 58. From the latter port, the oil circulates through ports 59 and 60 and conduit 37' to the oil cooler and reservoir 39' to repeat the cycle. The circulating oil lubricates and cools the contacting surfaces of the seal nose and seal ring, and since the parts of the assembly are exposed to the air, they are also cooled by the latter. This type of seal is materially simplified and may be found suitable for certain installations.

It will be understood that the foregoing description and drawings are not to be construed as limiting the invention but simply as illustrative of one application thereof, and that certain changes in construction and design may be adopted without departing from the scope of the invention as defined by the appended claims.

What is claimed is:

1. In apparatus having a rotating shaft projected through an opening in a housing containing a fluid under pressure, for example the crankcase of a turbo-compressor unit for a refrigeration system, a fluid pressure seal assembly for the joint between the shaft and housing comprising a sealing member fixed to the housing and having a seal nose with an axially-presented sealing surface formed with a channel or groove in the face thereof and a port communicating said channel with the exterior of the seal nose, a rotating seal unit including a seal ring and an axially movable annulus connected to the shaft for rotation with the latter, means associated with said annulus for sealing against leakage of fluid axially of the shaft and for transmitting fluid pressure through said annulus to said sealing ring, a seal housing enclosing the seal assembly and providing a chamber around the latter, means for circulating oil into and through the channel of the seal nose in contact with the rotating seal face and outwardly through said port into the chamber surrounding the seal assembly, and means for effecting a seal against leakage of fluid from said chamber axially outwardly along the shaft.

2. In apparatus having a rotating shaft projected through an opening in a housing containing fluid under pressure, a fluid pressure seal assembly for the joint between the shaft and housing comprising a stationary seal element having an axially projected seal nose, a rotating seal ring having a sealing surface in contact with the surface of the seal nose, the sealing surface of the seal nose being formed with a continuous groove and the body of the seal nose in rear of said surface being formed with an exhaust port feeding outwardly from said groove to the exterior of the said nose, said nose being also formed with an inlet port separate from said exhaust port for feeding oil to said channel, said continuous groove being of eccentric formation to effect distribution of oil over contacting sealing surfaces, and an oil circulating and cooling system in communication with said inlet and exhaust ports.

3. In apparatus having a rotating shaft projected through an opening in a housing containing fluid under pressure, a fluid pressure seal assembly for the joint between the shaft and housing comprising a stationary seal element having an axially presented sealing surface and a rotating sealing ring having a sealing surface in contact with the surface of said stationary element, means defining a chamber surrounding said assembly, the sealing surface of the stationary element being formed with a continuous groove and the body of the stationary element being formed with an oil inlet duct arranged to conduct oil through said stationary element to the said groove, said housing being formed with an oil circulating passage communicating with said inlet duct, the upper portion of the stationary element having formed therethrough an oil discharge duct having its inlet end receiving oil from said groove and its outlet end directed upwardly into said chamber, said discharge duct extending in rear of the sealing surface of the stationary element and being closed except at its inlet and outlet ends, means for circulating oil under pressure to and through said passage and inlet duct to said groove for effecting lubrication of relatively moving surfaces and thence through said discharge duct onto parts rotating in said chamber to cool said parts, said chamber being provided with an oil discharge port for returning oil to the circulating system.

4. In apparatus having a rotating shaft projected through an opening in a housing containing fluid under pressure, a fluid pressure seal assembly for the joint between the shaft and housing comprising a stationary seal element having an axially projected portion formed with an axially presented sealing surface and a rotating seal ring having a sealing surface in contact with the surface of said stationary element, the sealing surface of the stationary element being formed with a continuous relatively deep groove and the body of said stationary seal element being formed with an oil inlet duct through the lower portion thereof arranged to conduct oil through said stationary element to the said groove and the upper portion of the stationary element in rear of its sealing surface having formed therethrough an oil discharge duct having its inlet end receiving oil from said groove, said oil inlet and discharge ducts being closed except at the inlet and outlet ends thereof, a force feed oil circulating system arranged to conduct oil to said inlet duct and thence to said groove and from the latter through said outlet duct to be returned to the system, said groove being of eccentric formation in order to effect a wiping action on the surface of the rotating seal ring.

LEON BUEHLER, Jr.
FRANCIS SHENTON.